(12) United States Patent
Pierce

(10) Patent No.: US 11,298,994 B2
(45) Date of Patent: Apr. 12, 2022

(54) METHOD AND APPARATUS FOR TRAILER LOAD ASSIST IN A MOTOR VEHICLE

(71) Applicant: GM GLOBAL TECHNOLOGY OPERATIONS LLC, Detroit, MI (US)

(72) Inventor: Kyle D. Pierce, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 16/154,281

(22) Filed: Oct. 8, 2018

(65) Prior Publication Data
US 2020/0108678 A1 Apr. 9, 2020

(51) Int. Cl.
*B60D 1/24* (2006.01)
*G01G 19/12* (2006.01)
*B60D 1/64* (2006.01)

(52) U.S. Cl.
CPC .............. *B60D 1/247* (2013.01); *B60D 1/64* (2013.01); *G01G 19/12* (2013.01)

(58) Field of Classification Search
CPC .......... B60D 1/247; B60D 1/248; B60D 1/62; B60D 1/64; G01G 19/08; G01G 19/12; B60P 3/06; B60P 3/07; B62D 53/00; B60R 16/023; B60R 16/0232
See application file for complete search history.

(56) References Cited

U.S. PATENT DOCUMENTS

| 5,434,552 A * | 7/1995 | Ems ..................... B60D 1/06 280/432 |
| 5,558,350 A * | 9/1996 | Kimbrough .............. B60D 1/06 280/426 |
| 5,780,782 A * | 7/1998 | O'Dea .................... G01G 23/01 177/136 |
| 5,928,107 A * | 7/1999 | Bieber .................... F16H 61/16 477/97 |
| 6,053,521 A * | 4/2000 | Schertler ................. B60D 1/06 280/422 |
| 6,069,324 A * | 5/2000 | Shimizu ................. G01G 19/12 177/136 |
| 6,118,083 A * | 9/2000 | Boyovich .............. G01G 19/12 177/136 |
| 6,722,684 B1 * | 4/2004 | McAllister ............... B60D 1/06 177/146 |
| 6,829,943 B2 * | 12/2004 | Weyand ............... G01G 19/086 340/667 |
| 7,438,368 B2 * | 10/2008 | Kohler ................... B60D 1/065 188/1.11 E |
| 8,160,806 B2 * | 4/2012 | Salaka ..................... B60D 1/58 701/124 |
| 8,818,699 B2 * | 8/2014 | Nichols ................ B62D 53/021 701/124 |

(Continued)

*Primary Examiner* — Minnah L Seoh
*Assistant Examiner* — Maurice L Williams
(74) *Attorney, Agent, or Firm* — Lorenz & Kopf LLP

(57) ABSTRACT

The present application generally relates to a method and apparatus for trailer load assist in a motor vehicle. In particular, the system is operative to determine a trailer connection, determine an initial tongue weight and compare the initial tongue weight with a current tongue weight. A audible and/or visual cue is generated when the current tongue weight exceeds the initial tongue weight in a ratio indicative of an optimally loaded trailer.

18 Claims, 3 Drawing Sheets

(56) References Cited

U.S. PATENT DOCUMENTS

| | | | | |
|---|---|---|---|---|
| 8,890,670 B2* | 11/2014 | Brey | ............... | B60T 7/16 340/431 |
| 9,290,185 B2* | 3/2016 | Hall | ............... | G01G 19/086 |
| 9,327,566 B2* | 5/2016 | McAllister | ............... | G01L 19/10 |
| 9,643,462 B2* | 5/2017 | McAllister | ............... | B60D 1/248 |
| 9,738,125 B1* | 8/2017 | Brickley | ............... | B60D 1/26 |
| 9,870,653 B1* | 1/2018 | Fritz | ............... | B60D 1/62 |
| 10,106,002 B2* | 10/2018 | McAllister | ............... | G01L 19/10 |
| 10,300,928 B2* | 5/2019 | Trageser | ............... | B60W 50/14 |
| 10,309,824 B2* | 6/2019 | Fredrickson | ............... | B60D 1/248 |
| 2004/0036255 A1* | 2/2004 | Orlando | ............... | B60P 3/07 280/402 |
| 2005/0283296 A1* | 12/2005 | Viaud | ............... | B60D 1/248 701/50 |
| 2006/0290102 A1* | 12/2006 | VanBuskirk, Jr. | ............... | B60D 1/58 280/511 |
| 2007/0171031 A1* | 7/2007 | Hastings | ............... | B60D 1/58 340/431 |
| 2008/0148844 A1* | 6/2008 | Haberstroh | ............... | F17C 13/021 73/295 |
| 2008/0177454 A1* | 7/2008 | Bond | ............... | B60T 8/1708 701/70 |
| 2012/0024081 A1* | 2/2012 | Baker | ............... | G01L 5/136 73/862.338 |
| 2013/0253814 A1* | 9/2013 | Wirthlin | ............... | G01L 11/025 701/124 |
| 2014/0110918 A1* | 4/2014 | McCoy | ............... | B60D 1/248 280/511 |
| 2014/0327229 A1* | 11/2014 | Scharf | ............... | G01G 19/12 280/511 |
| 2015/0137482 A1* | 5/2015 | Woolf | ............... | B60D 1/06 280/448 |
| 2015/0323376 A1* | 11/2015 | Cullen | ............... | G01G 19/12 701/124 |
| 2018/0001928 A1* | 1/2018 | Lavoie | ............... | B60D 1/62 |
| 2018/0066978 A1* | 3/2018 | Millhouse | ............... | G01G 23/3735 |
| 2018/0100759 A1* | 4/2018 | Johansen | ............... | G01G 19/022 |
| 2018/0208241 A1* | 7/2018 | Shepard | ............... | B60D 1/62 |
| 2019/0143769 A1* | 5/2019 | Niedert | ............... | B60D 1/485 280/504 |
| 2019/0265112 A1* | 8/2019 | Reed | ............... | G01L 1/125 |

* cited by examiner

METHOD AND APPARATUS FOR TRAILER LOAD ASSIST IN A MOTOR VEHICLE

BACKGROUND

The present disclosure relates generally to a trailer loading function for use with a vehicle. More specifically, aspects of the present disclosure relate to systems, methods and devices for assisting a user in the loading of a load, such as a vehicle, on a trailer by providing feedback from a vehicle indicative of tongue weight, etc.

Problems often arise with load distribution when a user tries to distribute a load onto a trailer. It is difficult for a user to guess when the vehicle is in a position on the trailer which results in an evenly loaded trailer. Unevenly loaded trailers with either excessive weight rearward of the axle, or excessive weight towards the hitch may result in handling issues, such as trailer sway or fishtailing, excessive tire and vehicle suspension wear and damage. Some cases may result in loss of control of the vehicle resulting in a crash. It would be desirable for a user to determine when a vehicle is properly loaded on a trailer during the loading process to ensure safe handling of the trailer and tow vehicle.

The above information disclosed in this background section is only for enhancement of understanding of the background of the invention and therefore it may contain information that does not form the prior art that is already known in this country to a person of ordinary skill in the art.

SUMMARY

Disclosed herein are trailer loading assist methods and systems and related control logic for provisioning vehicle sensing and control systems, methods for making and methods for operating such systems, and motor vehicles equipped with onboard sensor and control systems. By way of example, and not limitation, there is presented various embodiments of detecting a trailer load distribution and alerting a driver of the trailer load distribution in response to the detection are disclosed herein.

In accordance with an aspect of the present invention, an apparatus comprising a first detector for generating a first control signal, a second detector for detecting an initial force value and a second force value in response to the first control signal, a processor for comparing the initial force value and the second force value and generating a cue control signal in response the second force value exceeding the initial force value by a threshold value, and a cue generator for generating a cue in response to the cue control signal.

In accordance with another aspect of the present invention an apparatus for assisting a trailer loading operation comprising a trailer detection sensor to detect the connection of a trailer to a vehicle and generating a detection control signal, a trailer weight sensor for determining an initial force on a trailer hitch in response to the detection control signal and generating an initial force value control signal and for determining a current force on the trailer hitch and for generating a force value control signal, a processor for receiving the initial force value control signal and the force value control signal and generating an indication control signal in response to the current force exceeding the initial force by a threshold value, and an indicator for generating an indication in response to the indication control signal.

In accordance with another aspect of the present invention a method for trailer load indication comprising determining an initial force value indicative of an initial tongue weight on a trailer hitch, determining a current force value indicative of a current tongue weight on a trailer hitch, and generating a cue in response to the current tongue weight exceeding the initial tongue weight by a threshold value.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
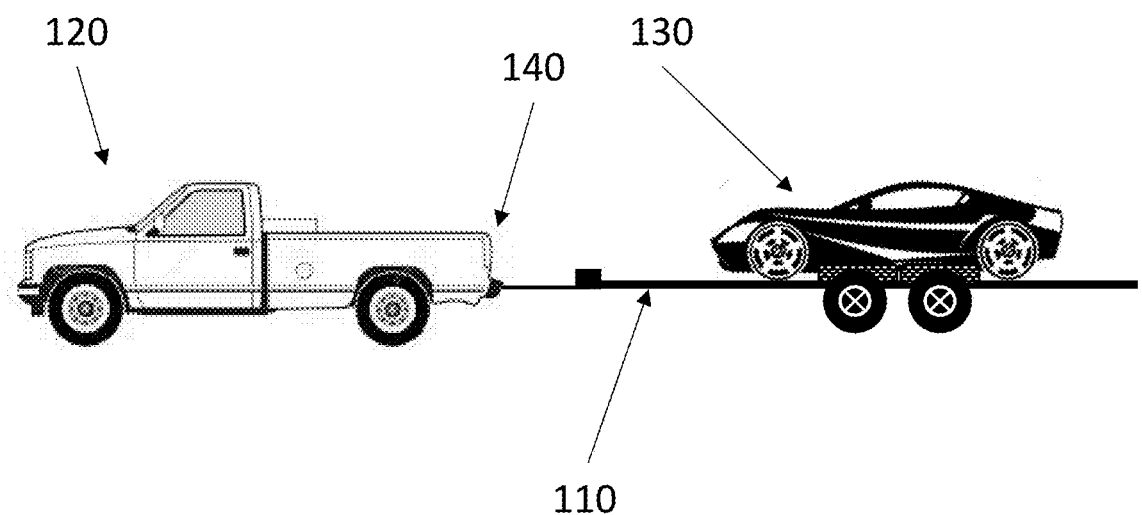
FIG. 1 illustrates an exemplary application of the method and apparatus for trailer load assist in a motor vehicle according to an embodiment of the present disclosure.

FIG. 1 schematically illustrates an exemplary application of the method and apparatus for trailer load assist in a motor vehicle 100 according to the present disclosure. In this exemplary embodiment, a towing vehicle 120 featuring the trailer load assist system is used in loading a trailer 110 with a loaded vehicle 130. In the description of this exemplary embodiment the trailer load is a loaded vehicle 120, but the presently disclosed system and method are applicable to any load. The towing vehicle 120 is equipped with rear lights 140, such as tail lights, and/or an audible alert system, such as a horn, buzzer, or chime, to alert the driver of the loaded vehicle of the load balance state of the trailer 110. In addition, the system may be operative to transmit a signal to a user device, such as a cellular phone, smartwatch, Bluetooth device, etc. The alert system could be implanted using a connected vehicle application, such as an wireless network connection between a smart phone and the vehicle communications system.

The exemplary trailer load assist system will assist a driver of the loading vehicle 130 to properly distribute the loading of the load on the trailer 110. When loading the trailer 110 proper weight must be applied to the tongue of the towing vehicle 120 ensuring that weight is located towards the front of the trailer 110, not the back, and evenly distributed not exceeding the max tongue weight. Customers not experienced with this knowledge and lacking the proper equipment to check will find this feature value added and gain confidence in their towing ability.

In an exemplary embodiment, when the trailer 110 connector is plugged to the towing vehicle 120, the trailer load assist system is enabled. A sensor may be used to detect tongue weight of trailer first. The sensor is then used to detect the change in tongue weight after the loaded vehicle 130 is loaded. The change can be used to determine if the loaded vehicle 130 has been properly loaded and safe to tow. If properly loaded vehicle can give a visual and audible signal similar to locking the door on a key fob. Alternatively, the towing vehicle 120 may provide a visual or audible cue that the load is correctly distributed prompting the towed vehicle driver to move the towed vehicle 130 forward or backwards on the trailer 110 in order to redistribute the load. In addition, the sensor may detect a torsion of the hitch in order to estimate a side to side distribution of the load. For example, if the loaded vehicle 130 is positioned too far to the left, the sensor may detect a torsion to the left and therefore provide a different visual, audible or haptic cue to the driver of the loaded vehicle 130 indicating the uneven loading. In addition, the cue may include a haptic cue, such as vibrating a mobile device, slight movement of the towing vehicle, activation of a smart watch vibration feature, vibrating accessory such as a vibrating key fob or dongle, haptic seat activation or haptic steering wheel activation.

The exemplary trailer load assist system may be beneficial to all drivers of towed loads, particularly operators both with and without towing experience. Operators not experienced with trailer loading knowledge and lacking the proper equipment to check proper loading will find this feature value added and gain confidence in their towing ability. The exemplary system is easy to use and utilizes alert mechanisms that preexist on the vehicle and are familiar to the operator.

Figure 2:
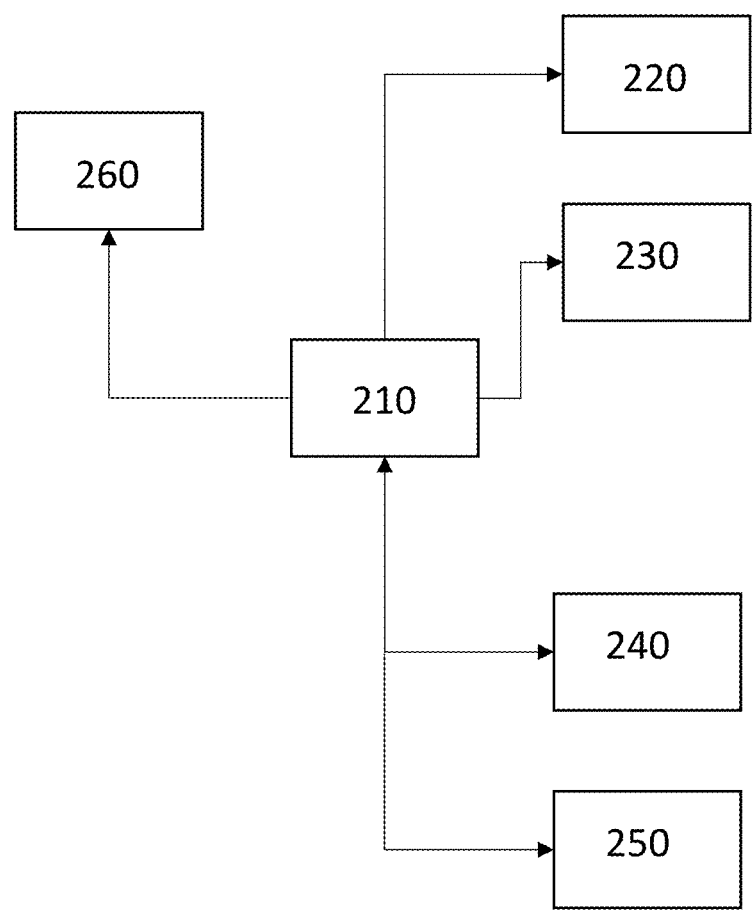
FIG. 2 shows a block diagram illustrating an exemplary system for trailer load assist in a motor vehicle according to an embodiment of the present disclosure.

Turning now to FIG. 2, a block diagram illustrating an exemplary system for trailer load assist in a motor vehicle 200 is shown. The trailer load assist system includes a trailer connection sensor 240, a tongue weight sensor 250, a wireless transmitter 260, a visual cue 230 an audible cue 220 and a processor 210. The system is first operative to receive an activation signal from a trailer connection sensor 240 or the like. The trailer connection sensor 240 may be implemented in the electrical connector for the trailer and detect when the electrical connection between the trailer and the towing vehicle is made. Alternatively, the trailer connection sensor 240 may detect a load on the lighting circuits, such as the running lights pin of a standard seven pin trailer connector. The load may be detected by a change in capacitance, voltage or current on a conductor. The trailer connection sensor 240 is operative to generate a detection signal to couple to the processor 210 responsive to the detection of a trailer.

The processor 210 is operative to receive the detection signal from the trailer connection sensor 240 and to generate a control signal to initiate a tongue weight measurement from the tongue weight sensor 250. The tongue weight sensor 250 is then operative to determine a downward force on the trailer hitch applied by the trailer coupler as a baseline for the unloaded trailer. The tongue weight sensor 250 is then operative to transmit this information to the processor 210. In addition, the tongue weight sensor 250 may be used to detect a torsion on the trailer hitch to establish a baseline measurement for side to side load distribution.

In this exemplary embodiment, the tongue weight sensor 250 is then operative to monitor for a reduction of the force applied to the trailer hitch by the trailer coupler, indicative of a vehicle being loaded onto the rear of the trailer. The tongue weight sensor 250 may optionally transmit a control signal to the processor indicative of this detection. The tongue weight sensor 250 continues to monitor until the force is equal to the baseline force detected initially, indicative of a balanced load on the trailer. The tongue weight sensor 250 may optionally transmit a control signal to the processor indicative of this detection. The tongue weight sensor 250 continues to monitor the force until an optimal tongue weight is detected. For example, an optimal tongue weight force may be determined when sixty percent of the load is towards the front of the trailer. When the optimal tongue weight force is determined, the tongue weight sensor 250 transmits a control signal to the processor indicative of this determination. Alternatively, the tongue weight sensor 250 may be operative to continually transmit a force measurement to the processor 210 such that the processor 210 is operative to determine the baseline tongue weight, beginning load detection, balanced load detection, and optimal tongue weight detection.

Once the optimal tongue weight detection is determined, either by the processor 210 or the tongue weight sensor 250, the processor is operative to generate a control signal for coupling to at least one of the audible cue 220 and the visual cue 230. The audible cue may be an activation of the vehicle horn for a short duration of time, or in a particular pattern to be recognized by the driver as an indication of the optimal trailer load distribution. Alternatively, the audible cue may be generated by a vehicle security siren in response to the control signal. The visual cue 230 may be activated in response to the control signal and may involve blinking of the rear tail lights of the towing vehicle, flashing of the bed light of a pickup truck, flashing of the vehicle interior cabin lights or the like. The audible cue 220 and the visual cue 230 may be operated in concert to alert the driver of the loading vehicle of the optimal load distribution. Alternatively, the processor may transmit the cue via the wireless transmitter 260 to a device proximate to the user, such as a smart phone, key fob, or the like.

Figure 3:
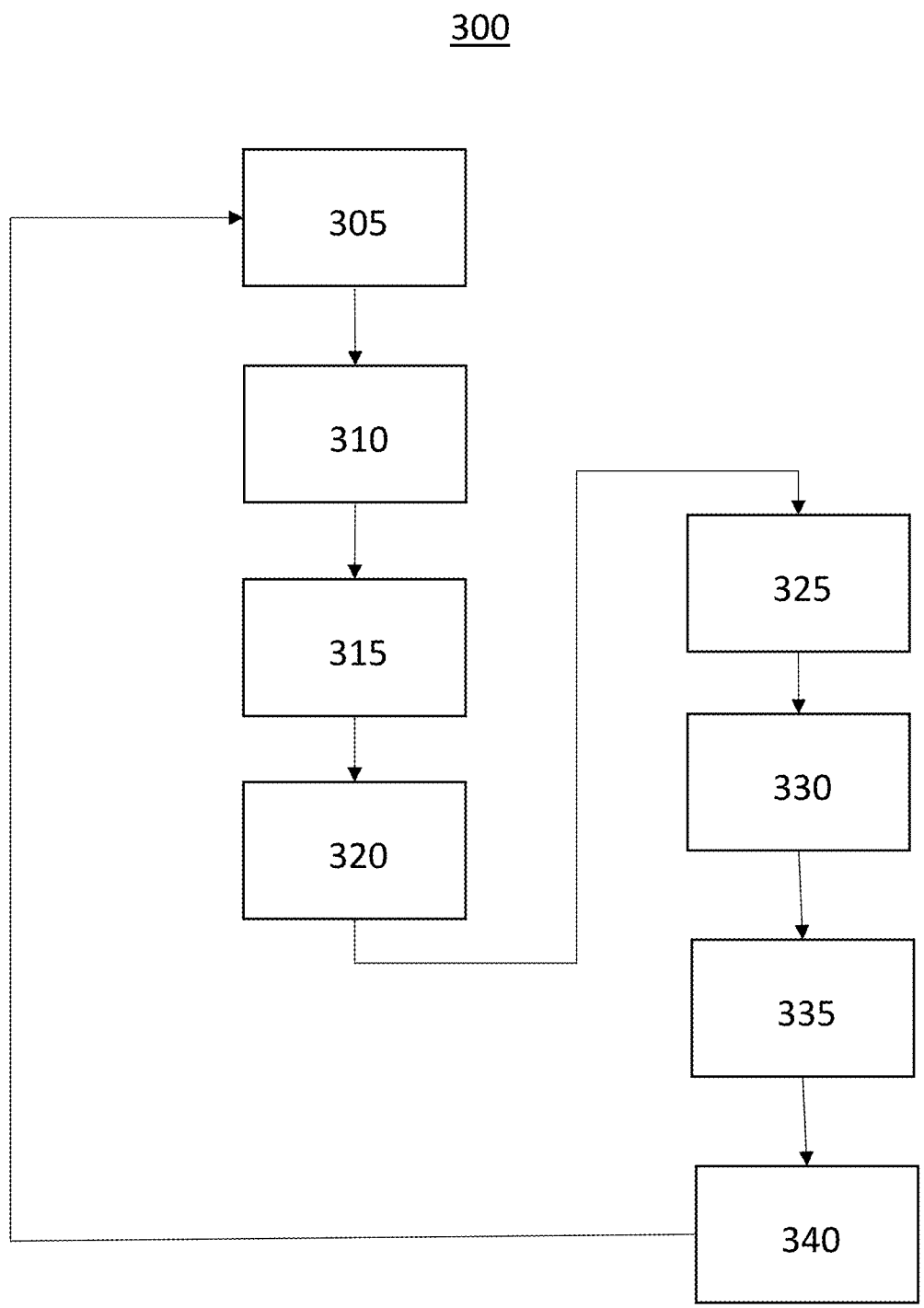
FIG. 3 shows a flowchart illustrating an exemplary method for trailer load assist according to another embodiment of the present disclosure.

Turning now to FIG. 3, a flowchart illustrating an exemplary method for trailer loading assist in a motor vehicle 300 is shown. The method 300 may be performed by a processor in the towing vehicle. The method is first operative to receive a first control signal from a trailer detection sensor 305. The first control signal is indicative of a trailer being connected to the electrical system of the towing vehicle. The method is then operative to activate a tongue weight detection sensor 310 for detecting the vertical force applied to the trailer hitch of the towing vehicle by the trailer tongue. The method is then operative to establish a baseline tongue weight indicative of an unloaded trailer 315 in response to an initial value determined by the tongue weight sensor. The method is then operative to determine a reduction of the baseline tongue weight 320 indicative of the loading of a vehicle on the trailer via rear loading ramps or the like. The method is then operative to determine a tongue weight comparable to the initial tongue weight 325 indicative of a balanced load on the trailer. The method is then operative to determine an increase in tongue weight indicative of an optimal trailer load distribution 330. The method is then operative to activate at least one of a visual cue, vibration, and an audible cue 335 in order to alert a driver of a loaded vehicle of the optimal trailer load distribution. In this exemplary embodiment, the tongue weight detections are continuously made by a tongue weight sensor while the vehicle is being driven forward on the trailer. Optionally, the method may continue to monitor the tongue weight force for a period of time during which the tongue weight force may change, each time providing an activation of at least one of the visual cue, vibration, and the audible cue when the optimal trailer load distribution is reached to accommodate a loaded vehicle being driven past the optimal trailer load distribution point and reversed. Once the tongue weight detection goes unchanged for a duration of time, for example two minutes, this may be indicative of a load being finally positioned on the trailer. The method may then deactivate the tongue weight sensor 340 and return to monitoring for a subsequent control signal from a trailer detection sensor 305. Alternatively, the method may be deactivated when the trailer is pulled by the towing vehicle. In addition, the method may be reactivated by a driver of the towing vehicle or remain activated for monitoring loads during operation. For example, while hauling loads through hills/mountains weight on the tongue could shift. The method could include advantageously continuous monitoring while towing. Visual could be on screen in vehicle or personal device or audible alert through infotainment when tongue weight has shifted undesirably.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term. "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context dearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An apparatus comprising:
    a first detector for generating a first control signal, wherein the first control signal is generated in response to detection of a trailer electrical connection;
    a second detector for detecting an initial vertical force value indicative of an initial trailer tongue weight in response to the first control signal, the second detector further operative to detect a reduction in vertical force after the detection of the initial vertical force and to detect a second vertical force value indicative of a current trailer tongue weight in response to the detection of the reduction in vertical force;
    a processor for comparing the initial force value and the second force value and generating a cue control signal in response the second force value exceeding the initial force value by a threshold value; and
    a cue generator for generating a cue in response to the cue control.

2. The apparatus of claim 1 wherein the initial force value and the second force value are indicative of a vertical force on a trailer hitch.

3. The apparatus of claim 1 wherein the initial force value is indicative of an unloaded trailer tongue weight.

4. The apparatus of claim 1 wherein threshold value is indicative of a ratio between a loaded trailer tongue weight and a loaded trailer tongue weight indicative of an optimal trailer load ratio.

5. The apparatus of claim 1 wherein the cue is a sound generated by a vehicle horn.

6. An apparatus for assisting a trailer loading operation comprising:
    a trailer detection sensor to detecting the connection of a trailer to a vehicle and generating a detection control signal;
    a trailer weight sensor for determining an initial force on a trailer hitch in response to the detection control signal and generating an initial force value control signal the trailer weight sensor further operative to detect a reduction in vertical force after the detection of the initial force and for determining a current force on the trailer hitch in response to the detection of the reduction in vertical force and for generating a force value control signal indicative of the current force;
    a processor for receiving the initial force value control signal and the force value control signal and generating an indication control signal in response to the current force exceeding the initial force by a threshold value; and
    an indicator for generating an indication in response to the indication control signal.

7. The apparatus of claim 6 wherein the indicator is at least one of a vehicle horn, a vehicle light, and a wirelessly linked device.

8. The apparatus of claim 6 wherein the threshold value is a ratio between the current force and the initial force indicative of an optimally loaded trailer weight distribution.

9. The apparatus of claim 6 wherein the trailer detection sensor is operative to determine an electrical connection between the vehicle and a trailer.

10. The apparatus of claim 6 wherein the initial force is indicative of an unloaded trailer and the current force is indicative of a loaded trailer.

11. The apparatus of claim 6 further comprising wherein the initial force and the current force are indicative of a vertical force on a trailer hitch.

12. A method for trailer load indication comprising:
    determining an initial force value indicative of an initial tongue weight on a trailer hitch;
    detecting a reduction in vertical force after the determination of the initial vertical force
    determining a current force value indicative of a current tongue weight on a trailer hitch in response to the detection of the reduction in vertical force; and
    generating a cue in response to the current tongue weight exceeding the initial tongue weight by a threshold value.

13. The method of claim 12 further comprising detecting a trailer connection and wherein the determination of the initial force is made in response to the detection.

14. The method of claim 12 wherein the cue is a flashing of at least one rear tail light of a vehicle.

15. The method of claim 12 wherein the cue is transmitted wireless to a mobile device.

16. The method of claim 12 wherein threshold value is indicative of an optimally loaded trailer.

17. The method of claim 12 wherein the determination of the initial force value and the current force value are made by a tongue weight sensor in a vehicle.

18. The method of claim 12 further comprising deactivating a tongue weight sensor in response to the current force value remaining constant for a time period.

* * * * *